(12) United States Patent
Huang (10) Patent No.: US 12,377,899 B2
(45) Date of Patent: Aug. 5, 2025

(54) BABY STROLLER CAPABLE OF IMPLEMENTING FREE SWITCHING BETWEEN SINGLE SEAT AND DOUBLE SEATS

(71) Applicant: Dongguan Leoace Metal & Plastic Products Co., Ltd., Guangdong (CN)

(72) Inventor: Xuhui Huang, Guangdong (CN)

(73) Assignee: Dongguan Leoace Metal & Plastic Products Co., Ltd., Dongguan (CN)

( * ) Notice: Subject to any disclaimer, the term of this patent is extended or adjusted under 35 U.S.C. 154(b) by 231 days.

(21) Appl. No.: 18/213,262

(22) Filed: Jun. 22, 2023

(65) Prior Publication Data

US 2024/0253684 A1 Aug. 1, 2024

(51) Int. Cl.
*B62B 7/08* (2006.01)
*B62B 7/00* (2006.01)
*B62B 9/12* (2006.01)

(52) U.S. Cl.
CPC .................. *B62B 7/08* (2013.01); *B62B 9/12* (2013.01); *B62B 7/008* (2013.01); *B62B 2206/02* (2013.01)

(58) Field of Classification Search
CPC .. B62B 9/28; B62B 9/12; B62B 7/008; B62B 2206/02
See application file for complete search history.

(56) References Cited

U.S. PATENT DOCUMENTS

| | | | | |
|---|---|---|---|---|
| 3,330,575 A | * | 7/1967 | Boudreau | B62B 9/26 280/649 |
| 4,577,355 A | * | 3/1986 | Kassai | B62B 7/123 5/99.1 |
| 4,623,163 A | * | 11/1986 | Potts | A61G 5/0858 280/47.38 |
| 6,267,404 B1 | * | 7/2001 | Yang | B62B 9/245 280/47.38 |
| 6,676,140 B1 | * | 1/2004 | Gondobintoro | B62B 9/28 280/657 |
| 8,915,516 B2 | * | 12/2014 | Yang | B62B 9/12 280/643 |
| 8,919,807 B2 | * | 12/2014 | Taylor | B62B 7/08 280/647 |

(Continued)

FOREIGN PATENT DOCUMENTS

| | | | | |
|---|---|---|---|---|
| CN | 202518316 U | * | 11/2012 | |
| CN | 105460070 A | * | 4/2016 | |

(Continued)

*Primary Examiner* — Emma K Frick (57) ABSTRACT

A baby stroller capable of implementing free switching between a single seat and double seats, includes a stroller body, wherein a retractable chassis is provided at the bottom of the stroller body, a retractable upper enclosure is mounted at a middle portion of the stroller body, the retractable upper enclosure comprises a fixed rod and a telescopic rod, the fixed rod and the telescopic rod each are hollow in a U shape, universal wheels are mounted at the bottom of the retractable chassis, and the telescopic rod is slidably connected in the fixed rod. According to the present invention, areas of an upper enclosure and a chassis of the stroller are reduced at the same time by means of the upper enclosure of the retractable chassis, so as to implement the retraction of the stroller body, and freely switch between the single seat and the double seats.

6 Claims, 7 Drawing Sheets

(56) References Cited

U.S. PATENT DOCUMENTS

| | | | |
|---|---|---|---|
| 9,199,659 B2 * | 12/2015 | Chen | ................ B62B 9/12 |
| 9,227,650 B2 * | 1/2016 | Gillett | ................ B62B 9/28 |
| 9,561,817 B2 * | 2/2017 | Laffan | ................ B62B 7/008 |
| 9,637,153 B2 * | 5/2017 | Sclare | ................ B62B 5/0016 |
| 2024/0326892 A1 * | 10/2024 | Zehfuss | ................ B62B 7/008 |

FOREIGN PATENT DOCUMENTS

| | | | | |
|---|---|---|---|---|
| CN | 108433443 A | * | 8/2018 | ............ A47D 13/02 |
| CN | 208881879 U | | 5/2019 | |
| TW | M359453 U | * | 6/2009 | |

* cited by examiner

BABY STROLLER CAPABLE OF IMPLEMENTING FREE SWITCHING BETWEEN SINGLE SEAT AND DOUBLE SEATS

CROSS REFERENCE TO RELATED APPLICATIONS

The present application claims the benefit of Chinese Patent Application No. 202320092014.5 filed on Jan. 31, 2023, the contents of which are incorporated herein by reference in their entirety.

TECHNICAL FIELD

The present invention relates to the technical field of baby strollers, and in particular, to a baby stroller capable of implementing free switching between a single seat and double seats.

BACKGROUND ART

Baby strollers are widely used in infants' travel. As the two-child policy is carried out in society, there are more and more two-child families. However, currently, most baby strollers each have one seat or two seats (generally designed for twin families). With the successive birth of children, it is necessary to purchase a baby stroller with two seats after the purchase of a baby stroller with one seat.

The applicant has been committed to the research and development of baby strollers. Previously, a baby stroller has been developed to implement the free switching between a single seat and double seats in the stroller. A retractable chassis of a stroller body is retracted by means of a retractable device of the retractable chassis, so that an area of the retractable chassis of the stroller body is reduced, and a riding space required for the single seat/double seats can be freely switched. However, the applicant has received reflection from the market that a retractable upper enclosure of this type of baby stroller cannot be locked by itself after the retractable upper enclosure is extended or retracted. When a single seat is provided, the retractable upper enclosure is prone to being extended forward under the action of an external force, which makes the retractable upper enclosure unstable and affects the safety. Now it is necessary to design a baby stroller in which a retractable upper enclosure and a retractable chassis extend or retract simultaneously and can be locked, to solve the existing outstanding problems.

SUMMARY OF THE INVENTION

An objective of the present invention is to provide a baby stroller capable of implementing free switching between a single seat and double seats, which re-optimizes a retractable mechanism of a retractable upper enclosure, so that the structure of the retractable upper enclosure is more stable after the extension or retraction, thereby solving the problem of insufficient safety mentioned in the background art.

To achieve the above objective, the present invention provides the following technical solution: a baby stroller capable of implementing free switching between a single seat and double seats, comprising a stroller body, wherein a retractable chassis is provided at the bottom of the stroller body, a retractable upper enclosure is mounted at a middle portion of the stroller body, the retractable upper enclosure comprises a fixed rod and a telescopic rod, the fixed rod and the telescopic rod each are hollow in a U shape, universal wheels are mounted at the bottom of the retractable chassis, the telescopic rod is slidably connected in the fixed rod, an end of the fixed rod is provided with a female locking buckle for positioning the telescopic rod, a sub-locking buckle is arranged in the telescopic rod, and a check block is fixed to an end of the telescopic rod; and the female locking buckle comprises a housing, the housing is fixed to an end of the fixed rod by means of a screw, the sub-locking buckle comprises a lock block, the lock block is mounted in an inner cavity of the telescopic rod, two lock blocks are provided, each of the lock blocks is internally provided with a positioning block, an inner cavity of the housing is provided with a limiting mechanism for slidably limiting the lock block, and the bottom of the housing is provided with a trigger mechanism of the positioning block.

Preferably, the limiting mechanism comprises a sliding groove, the sliding groove is provided in the inner cavity of the housing, an outer wall of the telescopic rod is provided with an integrally formed protruding strip, and the protruding strip is slidably connected in the sliding groove.

Preferably, the trigger mechanism comprises a spring button, a double-layer mounting plate is connected to a lower surface of the housing by means of a screw, the spring button is mounted on a lower surface of the mounting plate, a center of the mounting plate and an outer wall of the bottom of the fixed rod each are provided with a through groove for the spring button to run through, an upper surface of an end of the mounting plate is provided with a locking fastener, and two ends of the spring button are provided with bolts.

Preferably, the locking fastener comprises an inversely L-shaped buckle, a lower surface of the lock block is provided with an integrally formed arc-shaped protruding block, an end of the protruding block is provided with a fastening position, an end of the buckle penetrates through outer walls of the fixed rod and a movable rod, and a transverse plate of the buckle is tightly hooked at the fastening position.

Preferably, each of the positioning blocks is arranged in the shape of a rectangular strip, an integrally formed wedge-shaped ejector block is provided at the bottom of the positioning block, the ejector blocks of the two positioning blocks are arranged in a mirrored manner, and a lifting groove for the ejector block to vertically slide is formed in each of the lock blocks.

Preferably, the lifting groove is located above the through groove, the check block is arranged in the shape of a column, and an end of the check block is provided with an integrally formed boss.

Compared with the prior art, the present invention has the following beneficial effects:

according to the present invention, by arranging a spring button, a sub-locking buckle, and a female locking buckle, the sub-locking buckle is locked with the female locking buckle when the spring button is not pressed, and the telescopic rod of the retractable upper enclosure does not extend out of the fixed rod, thereby improving the stability of the retractable upper enclosure after locking, and improving the safety of the baby stroller; and according to the device, two sub-locking buckles are arranged, so that the baby stroller can be locked when the retractable upper enclosure is retracted for sitting by one person or extended for sitting by two persons, the arrangement of the button makes the locking after extension or retraction convenient to activate and deactivate, and thus the retractable upper enclosure can be easily extended or retracted and locked stably.

In the figures: 1. Stroller body; 2. Retractable chassis; 3. Retractable upper enclosure; 4. Fixed rod; 5. Telescopic rod; 6. Universal wheel; 7. Female locking buckle; 8. Sub-locking buckle; 9. Check block; 701. Housing; 801. Lock block; 802. Positioning block; 10. Trigger mechanism; 702. Sliding groove; 501. Protruding strip; 1001. Spring button; 1002. Mounting plate; 1003. Through groove; 1004. Buckle; 1005. Protruding block; 1006. Fastening position; 1007. Bolt; 803. Ejector block; 804. Lifting groove; 901. Boss.

DETAILED DESCRIPTION OF EMBODIMENTS

The technical solutions in the embodiments of the present invention will be clearly and completely described below in conjunction with the accompanying drawings in the embodiments of the present invention. Apparently, the embodiments described are merely some rather than all of the embodiments of the present invention. All other embodiments derived by a person of ordinary skill in the art on the basis of the embodiments of the present invention without involving any creative efforts shall fall within the scope of protection of the present invention.

Referring to FIGS. 1 to 8, the present invention provides a technical solution: a baby stroller capable of implementing free switching between a single seat and double seats, comprising a stroller body 1, wherein a retractable chassis 2 is provided at the bottom of the stroller body 1, a specific structure of the retractable chassis 2 pertains to the prior art, and for details, refer to a retractable device of a stroller chassis in Chinese patent CN 208881879 U, in which a retractable upper enclosure 3 is mounted at a middle portion of the stroller body 1, the retractable upper enclosure 3 comprises a fixed rod 4 and a telescopic rod 5, the fixed rod 4 and the telescopic rod 5 each are hollow in a U shape, universal wheels 6 are mounted at the bottom of the retractable chassis 2, the telescopic rod 5 is slidably connected in the fixed rod 4, an end of the fixed rod 4 is provided with a female locking buckle 7 for positioning the telescopic rod 5, a sub-locking buckle 8 is arranged in the telescopic rod 5, and a check block 9 is fixed to an end of the telescopic rod 5.

When the telescopic rod 5 is pulled manually, the retractable upper enclosure 3 is extended; and when the telescopic rod 5 is pushed inward, the retractable upper enclosure 3 is retracted, so that the switching between the single seat and the double seats is implemented. During extension or retraction of the telescopic rod 5, the sub-locking buckle 8 in the telescopic rod 5 is clamped in the female locking buckle 7, so that the structure after the extension or retraction is more stable.

Figure 1:
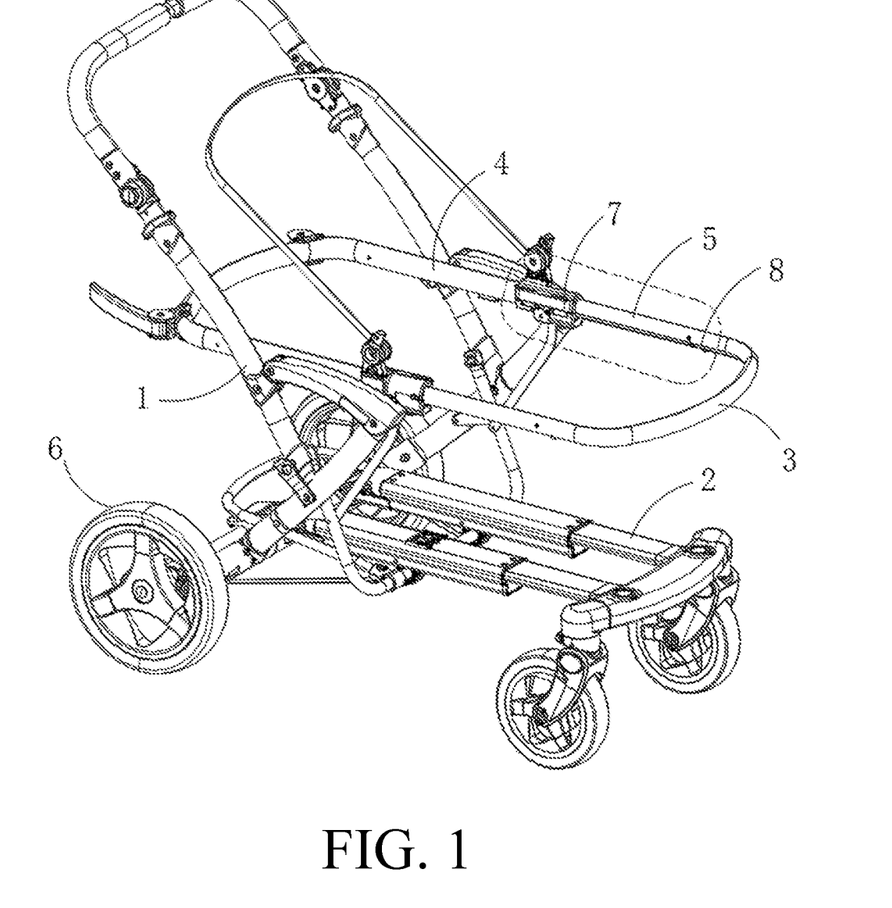
FIG. 1 is an axonometric drawing of the present invention.
Figure 2:
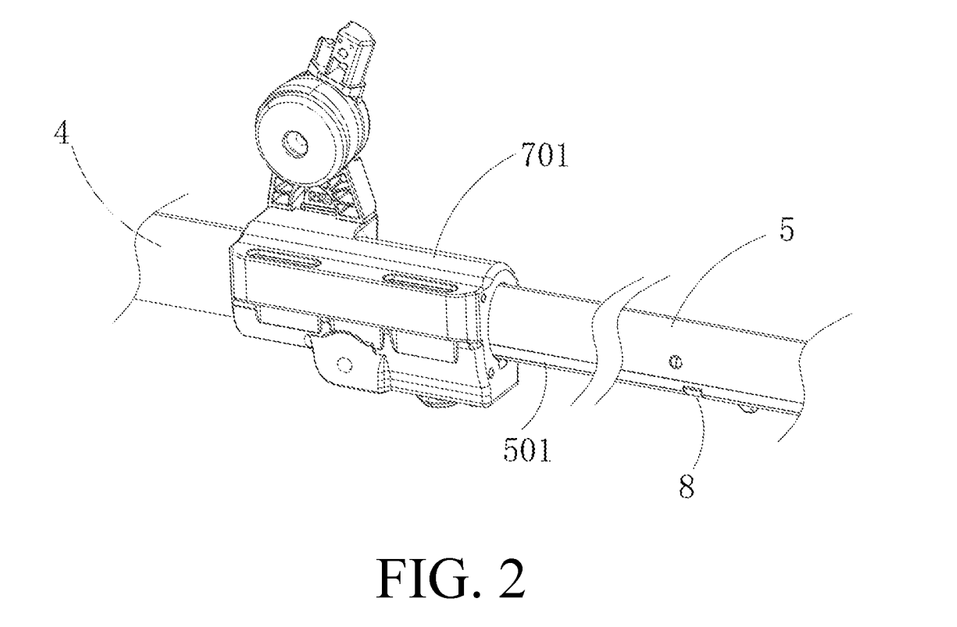
FIG. 2 is a schematic diagram of a position of a housing relative to a fixed rod and a telescopic rod according to the present invention.
Figure 3:
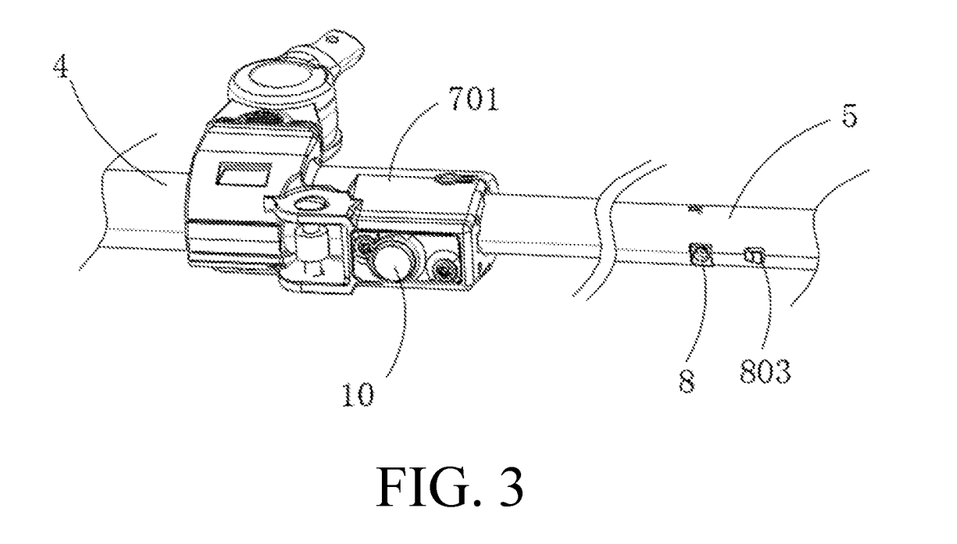
FIG. 3 is a schematic structural diagram of a spring button at the bottom of a housing according to the present invention.
Figure 4:
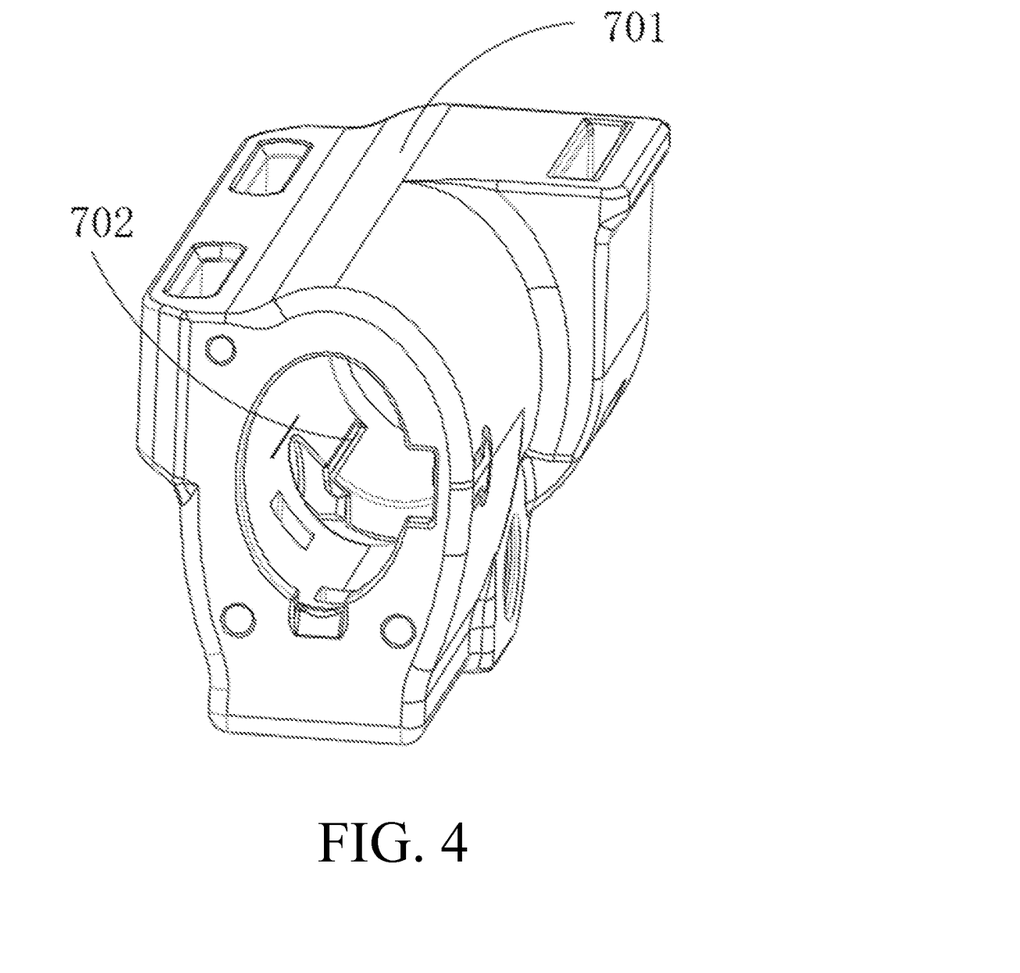
FIG. 4 is a schematic structural diagram of an interior of a housing according to the present invention.
Figure 5:
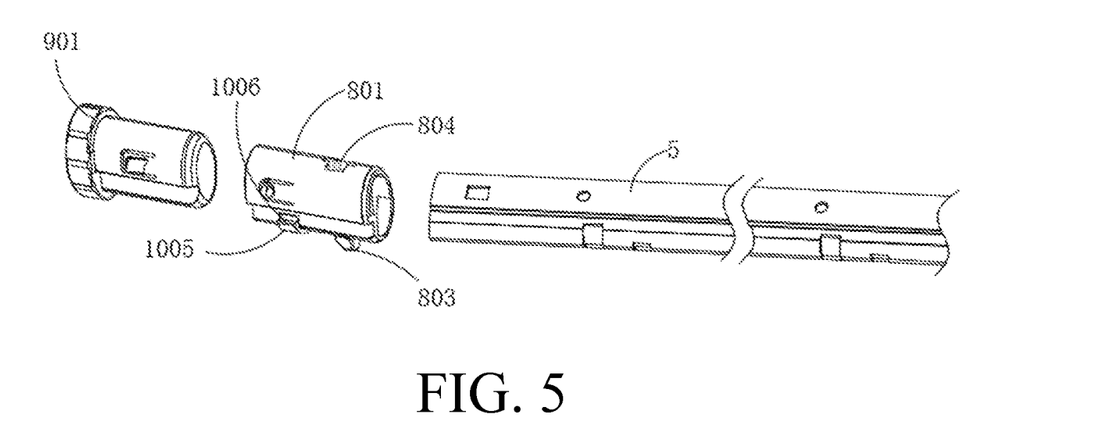
FIG. 5 is an exploded view of an interior of a telescopic rod according to the present invention.

The female locking buckle 7 comprises a housing 701, the housing 701 is fixed to an outer wall of an end of the fixed rod 4 by means of a screw, the sub-locking buckle 8 comprises a lock block 801, the lock block 801 is mounted in an inner cavity of the telescopic rod 5, and two lock blocks 801 are provided. As shown in FIGS. 5 and 3, the two lock blocks 801 are fixed in the telescopic rod 5, each of the lock blocks 801 is internally provided with a positioning block 802, and an inner cavity of the housing 701 is provided with a limiting mechanism for slidably limiting the lock block 801. As shown in FIGS. 4 and 3, the bottom of the housing 701 is provided with a trigger mechanism 10 of the positioning block 802.

By arranging the two lock blocks 801, when the telescopic rod 5 is extended, the lock block 801 at one end of the telescopic rod 5 moves into the female locking buckle 7, a spring button 1001 is pressed, and the lock block 801 is fastened by the trigger mechanism 10 at the bottom of the housing 701, thereby implementing extension positioning; and when the telescopic rod 5 is retracted into the fixed rod 4, the lock block 801 at the other end of the telescopic rod 5 enters the fixed rod 4, and the lock block 801 is fastened again by the trigger mechanism 10 at the bottom of the housing 701, thereby implementing the locking after the retraction, so that the retractable upper enclosure 3 of the baby stroller in the two states can be stabilized.

The limiting mechanism comprises a sliding groove 702, the sliding groove 702 is provided in the inner cavity of the housing 701, an outer wall of the telescopic rod 5 is provided with an integrally formed protruding strip 501, and the protruding strip 501 is slidably connected in the sliding groove 702.

By providing the sliding groove 702, the protruding strip 501 slides in the sliding groove 702, to play a guiding role when the telescopic rod 5 extends or retracts, and improve the smoothness of the extension or retraction of the retractable upper enclosure 3.

Figure 6:
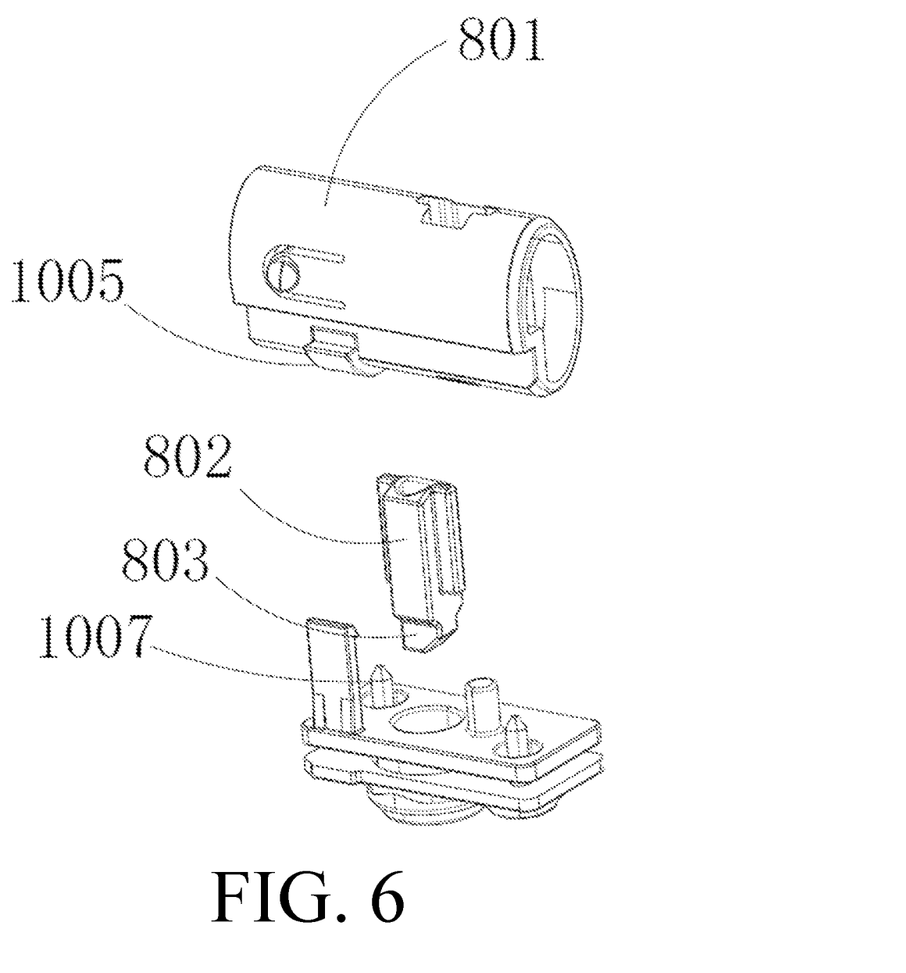
FIG. 6 is an exploded view of a sub-locking buckle according to the present invention.
Figure 7:
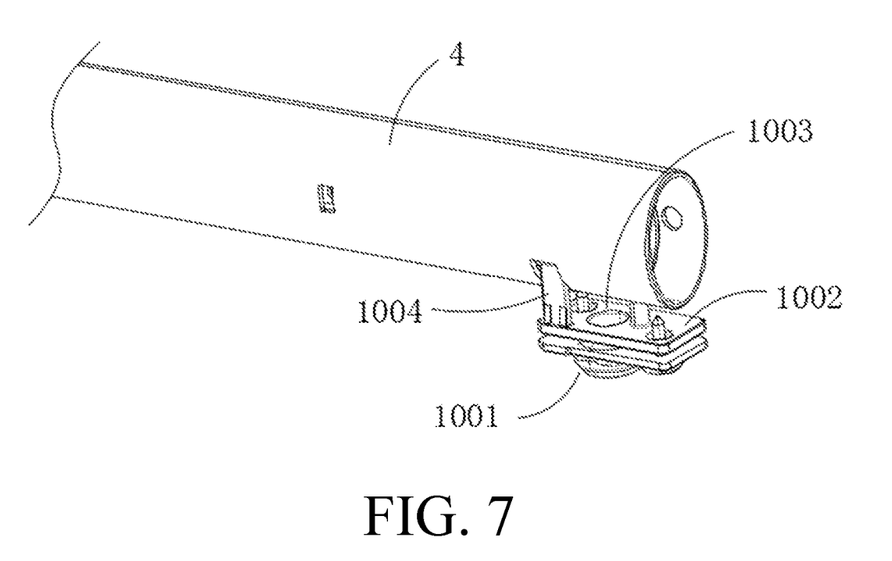
FIG. 7 is a schematic diagram showing positions of a buckle and a fixed rod according to the present invention.

The trigger mechanism 10 comprises a spring button 1001, and a double-layer mounting plate 1002 is connected to a lower surface of the housing 701 by means of a screw. The double-layer mounting plate 1002 is fixed to the housing 701, to provide a mounting position for the trigger mechanism 10, so as to brake the lock block 801 extending into the housing 701. The spring button 1001 is mounted on a lower surface of the mounting plate 1002, a center of the mounting plate 1002 and an outer wall of the bottom of the fixed rod 4 each are provided with a through groove 1003 for the spring button 1001 to run through, an upper surface of an end of the mounting plate 1002 is provided with a locking fastener, and two ends of the spring button 1001 are provided with bolts 1007, as shown in FIG. 6.

The spring button 1001 is an existing mechanism, which can be pressed in when pressed once and pop up when pressed again. When the spring button 1001 is pressed, an end of the spring button 1001 toward the housing 701 extends into the housing 701 to push the positioning block 802 up, the positioning block 802 being a component movably placed in the lock block 801. After the positioning block 802 is pushed up, an outer wall of the telescopic rod 5 does not protrude, and the telescopic rod 5 can be manually and freely pulled; and an ejector block 803 is located above the bolt 1007, and is no longer attached to a side wall of the bolt 1007 and no longer causes position interference, so that the telescopic rod 5 can be pulled. When the spring button 1001 is pressed again, the spring button 1001 is retracted downward, so that the positioning block 802 falls, the ejector block 803 at the bottom of the positioning block 802 is driven to move downward, and a side wall of the ejector block 803 is tightly attached to the side wall of the bolt 1007.

Figure 8:
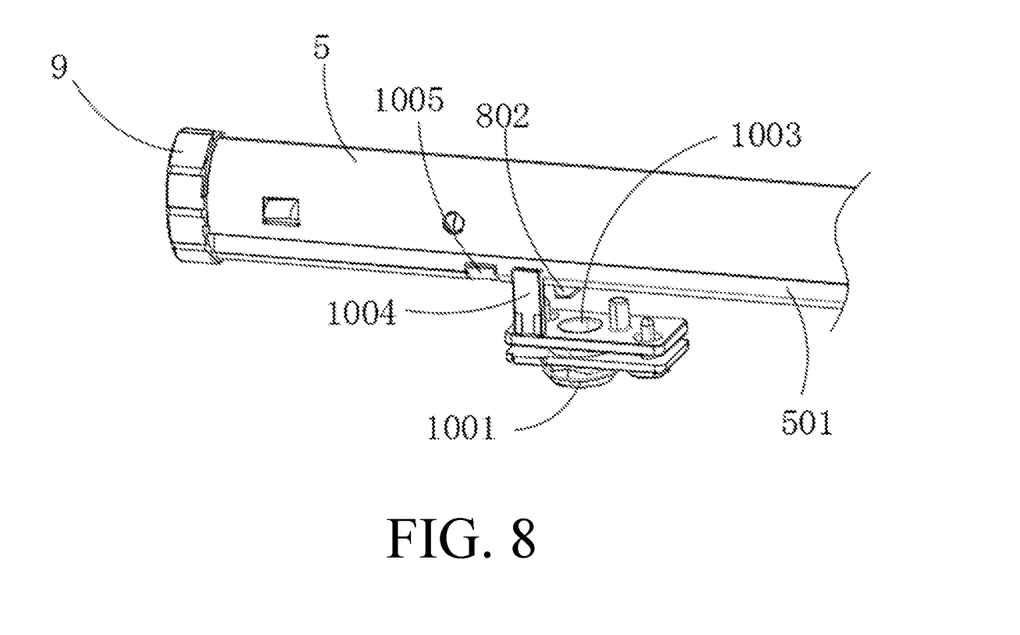
FIG. 8 is a schematic diagram showing positions of a buckle and a telescopic rod according to the present invention.

The locking fastener comprises an inversely L-shaped buckle 1004, a lower surface of the lock block 801 is provided with an integrally formed arc-shaped protruding block 1005, and an end of the protruding block 1005 is provided with a fastening position 1006. As shown in FIGS. 6 and 8, an end of the buckle 1004 penetrates through outer walls of the fixed rod 4 and a movable rod, and a transverse plate of the buckle 1004 is tightly hooked at the fastening position 1006. By providing the buckle 1004, the buckle 1004 is hung at the fastening position 1006, so that the telescopic rod 5 does not shake.

The positioning block 802 is arranged in the shape of a rectangular strip, an integrally formed wedge-shaped ejector block 803 is provided at the bottom of the positioning block 802, and the ejector blocks 803 of the two positioning blocks 802 are arranged in a mirrored manner. That is, inclined planes of the two ejector blocks 803 are in different directions, one inclines leftward, and the other inclines rightward. As shown in FIGS. 5 and 6, a lifting groove 804 for the ejector block 803 to vertically slide is formed in the lock block 801. When the spring button 1001 is pressed, the positioning block 802 moves upward in the lifting groove 804, and drives the ejector block 803 to retract into the lock block 801. When the spring button 1001 is pressed again, the positioning block 802 falls down in the lifting groove 804 under the action of gravity without the support from the spring button 1001, so that the ejector block 803 is exposed from the lock block 801, as shown in FIG. 5.

The lifting groove 804 is located above the through groove 1003, the check block 9 is arranged in the shape of a column, and an end of the check block 9 is provided with an integrally formed boss 901.

During use, when the telescopic rod 5 is pulled manually, the retractable upper enclosure 3 is extended; and when the telescopic rod 5 is pushed inward, the retractable upper enclosure 3 is retracted, so that the switching between the single seat and the double seats is implemented. When the telescopic rod 5 extends, the spring button 1001 is first pressed, and the end of the spring button 1001 toward the housing 701 extends into the housing 701 to push the positioning block 802 up, the positioning block 802 being a component movably placed in the lock block 801. After the positioning block 802 is pushed up, the outer wall of the telescopic rod 5 does not protrude, and the telescopic rod 5 can be manually and freely pulled. The telescopic rod 5 is manually pulled out, so that the lock block 801 located at a bent end of the fixed rod 4 is located at the housing 701.

When the spring button 1001 is pressed again, the spring button 1001 is retracted downward, so that the positioning block 802 falls, the ejector block 803 at the bottom of the positioning block 802 is driven to move downward, and the side wall of the ejector block 803 is tightly attached to the side wall of the bolt 1007, thereby avoiding sliding again. In addition, the transverse plate of the L-shaped buckle 1004 is tightly hooked at the fastening position 1006, the fastening position 1006 being a platform formed by the arc-shaped protruding block 1005 on the lower surface of the lock block 801. After the fastening, the housing 701 is fixed to the lock block 801 to prevent the telescopic rod 5 from shaking.

According to the present invention, areas of an upper enclosure and a chassis of the stroller are reduced at the same time by means of the upper enclosure of the retractable chassis, so as to implement the retraction of the stroller body, and freely switch between the single seat and the double seats. The retractable upper enclosure has a locking function. By arranging a spring button, a sub-locking buckle, and a female locking buckle, the sub-locking buckle is locked with the female locking buckle when the spring button is not pressed, and the telescopic rod of the retractable upper enclosure does not extend out of the fixed rod, thereby improving the stability of the retractable upper enclosure after locking, and improving the safety of the baby stroller.

Although the embodiments of the present invention have been shown and described, it can be understood by a person of ordinary skill in the art that many changes, modifications, replacements and variations may be made to these embodiments without departing from the principles and spirit of the present invention, and the scope of the present invention is defined by the appended claims and equivalents thereof.

The invention claimed is:

1. A baby stroller capable of implementing free switching between a single seat and double seats, comprising a stroller body (1), a retractable chassis (2) being provided at the bottom of the stroller body (1), characterized in that a retractable upper enclosure (3) is mounted at a middle portion of the stroller body (1), the retractable upper enclosure (3) comprises a fixed rod (4) and a telescopic rod (5), the fixed rod (4) and the telescopic rod (5) each are hollow in a U shape, universal wheels (6) are mounted at the bottom of the retractable chassis (2), the telescopic rod (5) is slidably connected in the fixed rod (4), an end of the fixed rod (4) is provided with a female locking buckle (7) for positioning the telescopic rod (5), a sub-locking buckle (8) is arranged in the telescopic rod (5), and a check block (9) is fixed to an end of the telescopic rod (5); and the female locking buckle (7) comprises a housing (701), the housing (701) is fixed to an end of the fixed rod (4) by means of a screw, the sub-locking buckle (8) comprises a lock block (801), the lock block (801) is mounted in an inner cavity of the telescopic rod (5), two lock blocks (801) are provided, each of the lock blocks (801) is internally provided with a positioning block (802), an inner cavity of the housing (701) is provided with a limiting mechanism for slidably limiting the lock block (801), and the bottom of the housing (701) is provided with a trigger mechanism (10) of the positioning block (802).

2. The baby stroller capable of implementing free switching between a single seat and double seats according to claim 1, characterized in that the limiting mechanism comprises a sliding groove (702), the sliding groove (702) is provided in the inner cavity of the housing (701), an outer wall of the telescopic rod (5) is provided with an integrally formed protruding strip (501), and the protruding strip (501) is slidably connected in the sliding groove (702).

3. The baby stroller capable of implementing free switching between a single seat and double seats according to claim 2, characterized in that the trigger mechanism (10) comprises a spring button (1001), a double-layer mounting plate (1002) is connected to a lower surface of the housing (701) by means of a screw, the spring button (1001) is mounted on a lower surface of the mounting plate (1002), a center of the mounting plate (1002) and an outer wall of the bottom of the fixed rod (4) each are provided with a through groove (1003) for the spring button (1001) to run through, an upper surface of an end of the mounting plate (1002) is provided with a locking fastener, and two ends of the spring button (1001) are provided with bolts (1007).

4. The baby stroller capable of implementing free switching between a single seat and double seats according to claim 3, characterized in that the locking fastener comprises an inversely L-shaped buckle (1004), a lower surface of the lock block (801) is provided with an integrally formed arc-shaped protruding block (1005), an end of the protruding block (1005) is provided with a fastening position (1006), an end of the buckle (1004) penetrates through outer walls of the fixed rod (4) and a movable rod, and a transverse plate of the buckle (1004) is tightly hooked at the fastening position (1006).

5. The baby stroller capable of implementing free switching between a single seat and double seats according to claim 4, characterized in that each of the positioning blocks (802) is arranged in the shape of a rectangular strip, an integrally formed wedge-shaped ejector block (803) is provided at the bottom of the positioning block (802), the ejector blocks (803) of the two positioning blocks (802) are arranged in a mirrored manner, and a lifting groove (804) for the ejector block (803) to vertically slide is formed in each of the lock blocks (801).

6. The baby stroller capable of implementing free switching between a single seat and double seats according to claim 5, characterized in that the lifting groove (804) is located above the through groove (1003), the check block (9) is arranged in the shape of a column, and an end of the check block (9) is provided with an integrally formed boss (901).

\* \* \* \* \*